(12) United States Patent
Bartenstein (10) Patent No.: US 9,777,877 B2
(45) Date of Patent: Oct. 3, 2017

(54) PIPE CONNECTOR AND ARRANGEMENT WITH A PIPE CONNECTOR

(71) Applicant: Uponor Innovation AB, Virsbo (SE)

(72) Inventor: Paul Bartenstein, Westhausen (DE)

(73) Assignee: UPONOR INNOVATION AB, Virsbo (SE)

( * ) Notice: Subject to any disclaimer, the term of this patent is extended or adjusted under 35 U.S.C. 154(b) by 0 days.

(21) Appl. No.: 14/768,494

(22) PCT Filed: Feb. 18, 2014

(86) PCT No.: PCT/EP2014/053135
§ 371 (c)(1),
(2) Date: Aug. 18, 2015

(87) PCT Pub. No.: WO2014/128123
PCT Pub. Date: Aug. 28, 2014

(65) Prior Publication Data
US 2016/0215911 A1    Jul. 28, 2016

(30) Foreign Application Priority Data

Feb. 20, 2013  (DE) .................... 20 2013 100 762 U (51) Int. Cl.
*F16L 37/00* (2006.01)
*F16L 41/02* (2006.01)
(Continued)

(52) U.S. Cl.
CPC .............. *F16L 41/02* (2013.01); *E03B 7/045* (2013.01); *F16L 15/00* (2013.01); *F16L 33/2071* (2013.01); *F16L 37/00* (2013.01)

(58) Field of Classification Search
CPC .................. F16L 41/02; E03B 7/045
(Continued)

(56) References Cited

U.S. PATENT DOCUMENTS

| 880,156 | A | * | 2/1908 | McCaffrey | ............. E03C 1/284 |
| | | | | | 137/216.1 |
| 927,035 | A | * | 7/1909 | Fruin | ..................... E03C 1/122 |
| | | | | | 285/129.1 |

(Continued)

FOREIGN PATENT DOCUMENTS

| CA | 2740132 | | 11/2012 | |
| DE | 667457 | C * | 11/1938 | ............. F16L 41/02 |

(Continued)

*Primary Examiner* — David E Bochna
*Assistant Examiner* — James A Linford
(74) *Attorney, Agent, or Firm* — Occhiuti & Rohlicek LLP (57) ABSTRACT

A pipe connector comprises a first connection, a second connection and a third connection. Longitudinal axes of the connections are located substantially in a first plane. The first connection and the second connection are arranged on a common side in relation to a second plane, wherein the second plane is aligned perpendicular to the first plane and runs through the longitudinal axis of the third connection. The first connection and the second connection are linked by means of a U-shaped pipe section, wherein an elongated pipe section has the third connection being formed out from the U-shaped pipe section. The first connection and the second connection are spaced from one another in such a manner that the first connection and the second connection are accessible for connection of pipe lines by means of a tool, in particular a pressing tool.

14 Claims, 4 Drawing Sheets

(51) Int. Cl.
*F16L 15/00* (2006.01)
*F16L 33/207* (2006.01)
*E03B 7/04* (2006.01)

(58) Field of Classification Search
USPC .............. 285/129.1, 129.2, 134.1–135.5
See application file for complete search history.

(56) References Cited

U.S. PATENT DOCUMENTS

| | | | |
|---|---|---|---|
| 1,678,783 | A | 7/1928 | Oakley |
| 2,859,764 | A * | 11/1958 | Golay ............... A01J 5/042 119/14.01 |
| 4,371,991 | A | 2/1983 | Schrott |
| 4,807,340 | A * | 2/1989 | Fuller ............... F16L 41/02 29/401.1 |
| 6,505,866 | B1 | 1/2003 | Nakamura et al. |

FOREIGN PATENT DOCUMENTS

| | | | | |
|---|---|---|---|---|
| DE | 858482 | C * | 12/1952 | ........... B21C 37/296 |
| DE | 03510344 | A1 | 9/1986 | |
| DE | 29803390 | U1 | 5/1998 | |
| DE | 29801592 | U1 | 9/1998 | |
| DE | 102009011177 | A1 | 4/2013 | |
| EP | 2226545 | B1 | 7/2013 | |
| FR | 1184350 | A * | 7/1959 | ............. F16L 41/02 |
| WO | 03/004924 | | 1/2003 | |
| WO | 2008/152232 | A2 | 12/2008 | |

\* cited by examiner

PIPE CONNECTOR AND ARRANGEMENT WITH A PIPE CONNECTOR

CROSS-REFERENCE TO RELATED APPLICATIONS

This application is a US National Stage of International Application No. PCT/EP2014/053135, filed on Feb. 18, 2014, which claims the priority of DE Application No. 20 2013 100762.5 filed on Feb. 20, 2013. The contents of each of the above-referenced applications are incorporated herein by reference in its entirety

FIELD OF INVENTION

The invention relates to a pipe connector which comprises a first connection, a second connection and a third connection. The invention relates further to an arrangement with a pipe connector.

BACKGROUND

Pipe connectors or press fittings having several connections for the connection of pipes are known in a wide variety of configurations. The connections comprise at least one press sleeve, which is radially deformed by means of a press tool, as a result of which the connection end of a pipe surrounded by the press sleeve is pressed against a supporting member of the press fitting and pipe connector and sealed. An example of such a pipe connector is what is known as a double wallplate with three connections for use in series-pipe or ring-pipe systems in plumbing installations.

Nowadays ring-pipe or series-pipe systems are installed for preference. In series-pipe systems, a pipe line is led from consumer to consumer via double wallplates. The last consumer of the pipe line should be a frequently used consumer, for example, a washbasin of a bathroom. For example, by using the washbasin the water is flushed through all pipe lines, with no areas of stagnation forming. Areas of stagnation are sections of pipe in which the water therein is not moved or flushed, and unhygienic conditions, for example, as a result of bacteria formation, may occur. In ring-pipe systems, in addition to the series-pipe systems a pipe line is laid from the last consumer to the start of the series-piping. This has that advantage that every time a consumer is used the water flows from both directions to the consumer and independently of the actuation of a consumer connected to the ring-pipe water always flows through all ring-pipe line sections.

The disadvantage of double wallplates is that they require a considerable amount of space for the connection of pipes and are virtually impossible to use in in-wall installations such as concealed thermostatic fittings or armatures, concealed WC cisterns or wall-hung urinals for example.

SUMMARY OF INVENTION

One problem addressed by the invention is to describe a pipe connector and an arrangement with a pipe connector which are suitable for use in ring-pipe or series-pipe systems with concealed or in-wall installations.

A first aspect of the invention discloses a connector for an in-wall installation of a series-pipe system or a ring-pipe system comprising solely a first connection, a second connection and a third connection. The pipe connector is characterised in that the pipe connector is produced in one piece and that longitudinal axes of the connections are located substantially in a first plane. Furthermore, the first connection and the second connection are arranged on a common side in relation to a second plane, the second plane being aligned perpendicular to the first plane and running through the longitudinal axis of the third connection.

The pipe connector according to the first aspect of the invention, which can also be called pipe fitting, provides for the first connection, the second connection and the third connection of the pipe connector to be located in one and the same plane. In addition, the first and the second connection are located on a common side. As a result, it is possible for example in a simple manner to install a series-pipe or ring-pipe system combined with a concealed installation, in particular with concealed thermostatic fittings or armatures. At this point it is mentioned, that in terms of this application the wording "concealed" is used equally to the wording "in-wall". In this case, pipe lines can be connected via the first connection and the second connection, whilst a consumer, for example, a WC flushing system, can be connected to the third connection. Because, unlike double wallplates, the connections are located in one plane, only a little installation space is required for the pipe connection points. In particular, only a small installation depth, for example, perpendicular to a building wall, is required. The pipe connector according to the invention is moreover also suitable for use in pre-wall or wall-mounted installations, in which case likewise only a small overall installation depth is required and the overall depth compared with conventional pre-wall and wall-mounted installations can be substantially reduced.

According to the invention, the third connection has a thread, in particular an external thread, for connection of the pipe connector to a consumer. It is thus possible in a simple manner, for example, without tools, to connect the pipe connector to a consumer by screwing it thereto.

According to an advantageous embodiment the first connection and the second connection are linked by means of a U-shaped pipe section, an elongate pipe section having the third connection being formed from the U-shaped pipe section. By means of the U-shaped pipe section a continuous pipe run between the first connection and the second connection is produced. Pressure losses in the pipe connector when a medium, for example, water, is passed via the first connection to the second connection are consequently only slight.

According to a further advantageous embodiment, the longitudinal axes of the first connection and the second connection are aligned parallel to one another. It is consequently possible to connect pipe lines to the first connection and the second connection that can be laid parallel to one another and thus extremely compactly and space savingly.

According to a further advantageous embodiment of the invention, the longitudinal axes of the first connection and the second connection are each aligned perpendicular to the longitudinal axis of the third connection. It is accordingly possible to connect a consumer to the third connection perpendicular to pipe lines connected to the first connection and second connection.

According to a further advantageous embodiment of the invention, the pipe connector has an inner channel with a substantially circular cross-section for linking the three connections. As a result, pressure losses inside the pipe connector are minimised and a favourable flow profile of a medium flowing through, for example, water, is achieved.

According to a further advantageous embodiment of the invention, the first connection and the second connection are spaced from one another in such a manner that the first connection and the second connection are accessible for connection of pipe lines by means of a tool, in particular a pressing tool. It is consequently possible to connect pipe lines to the first connection and to the second connection by means of a corresponding tool, for example, a pressing tool.

According to a further advantageous embodiment, the third connection has a pre-determined length, and therefore the first connection and the second connection are accessible for the connection of pipe lines by means of a tool, in particular a press tool when a consumer is connected to the third connection. It is therefore possible to connect the pipe connector to a consumer by means of the third connection and afterwards to connect pipe lines to the first connection and second connection. This is especially advantageous when, in a first assembly step, the pipe connector has to be screwed to a consumer via a thread of the third connection.

According to a further advantageous embodiment of the invention, the pipe connector is produced in one piece, in particular by means of a casting method. This enables the connector to be produced in a simple manner that saves on materials.

According to a further advantageous embodiment of the invention, the pipe connector is suitable for use in series-pipe or ring-pipe systems. It is thus possible to avoid stagnation areas and hence lack of hygiene in pipe lines.

According to a further advantageous embodiment, the pipe connector is suitable for connection to a connection element of a concealed fitting. This is possible owing to the fact that the connections of the pipe connector lie in one plane and the pipe connector therefore has only a small overall depth.

A second aspect of the invention discloses an arrangement having a pipe connector according to the first aspect of the invention and a concealed fitting. The concealed fitting may be preferable an in-wall armature. In this case the pipe connector is screwed via a thread of the third connection into a connection of a connection element of the concealed fitting, in particular a hot or cold water connection.

The arrangement according to the second aspect of the invention comprises substantially the above-mentioned advantages.

Further advantageous embodiments are disclosed in the following detailed description of exemplary embodiments and in the dependent claims.

Exemplary embodiments of the invention are described hereafter with reference to the appended figures. In the figures, similar components of different embodiments are provided with the same reference signs.

DETAILED DESCRIPTION

Figure 1:
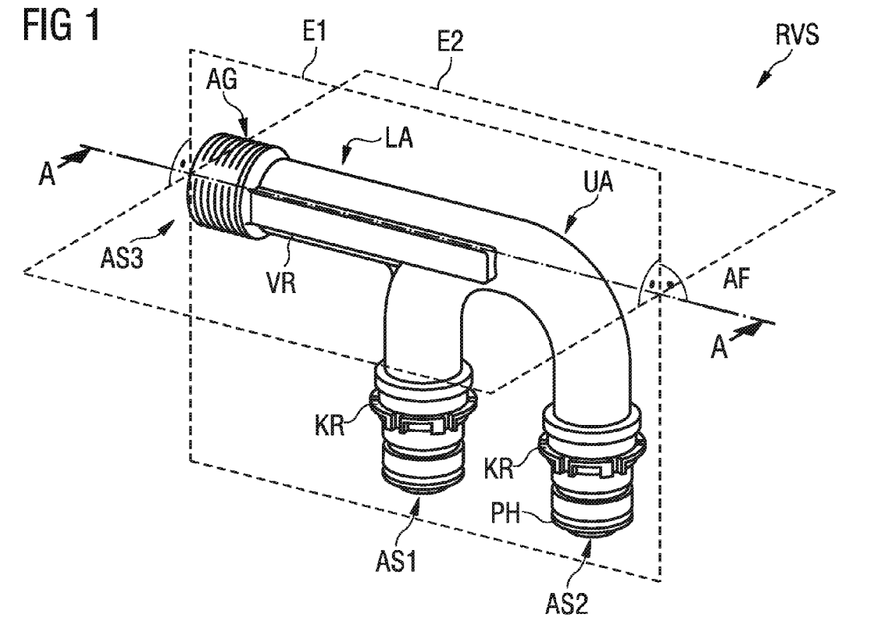
FIG. 1 shows a three-dimensional view of a pipe connector.
Figure 2:
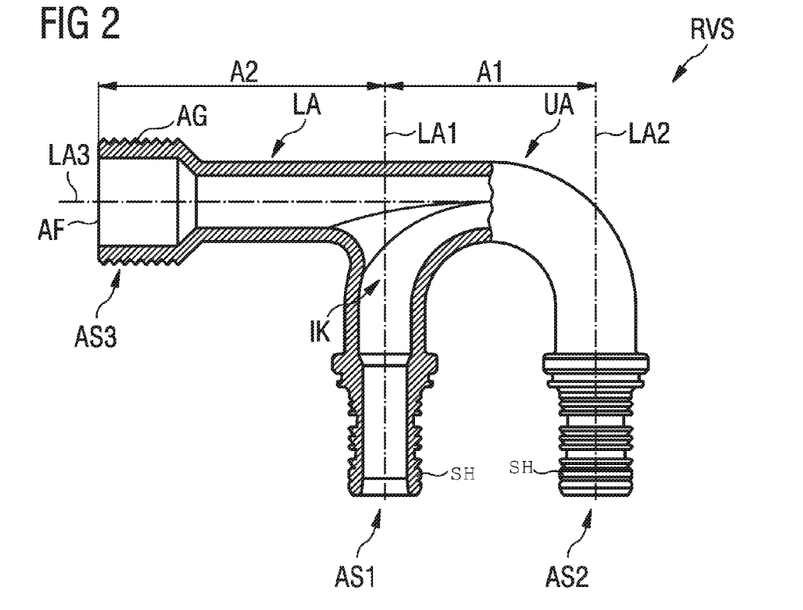
FIG. 2 shows a lateral and partially sectional view of the pipe connector.

FIG. 1 and FIG. 2 shows a pipe connector RVS with a first connection AS1, a second connection AS2 and a third connection AS3. FIG. 1 shows a three-dimensional view of the pipe connector RVS. FIG. 2 shows a lateral and partially sectional view of the pipe connector RVS along a sectional plane A-A of FIG. 1.

The pipe connector RVS comprises a U-shaped pipe section UA, which links the first connection AS1 to the second connection AS2. An elongated pipe section LA is formed out from the U-shaped pipe section UA and the third connection AS3 is arranged at the end of said elongated pipe section. The elongated pipe section LA additionally has a reinforcing rib VR, which increases the rigidity of the elongated pipe section LA. This protects the elongated pipe section LA against deformation and also against torsion. The third connection AS3 has an external thread AG, by which the pipe connector RVS can be screwed, for example, into a connection of a consumer having a complementary internal thread.

As can be seen in FIG. 1, the first connection AS1 and the second connection AS2 each comprise a press sleeve PH and an optional plastic ring KR (not shown in FIG. 2). The plastic ring KR and the press sleeve PH are slipped or pushed over a supporting sleeve SH (see FIG. 2) of the first connection AS1 and the second connection AS2. One end of a pipe line can now be slipped between the press sleeve PH and the supporting sleeve SH and can subsequently be joined firmly and in a sealed manner to the first connection AS1 and to the second connection AS2 of the pipe connector RVS by radial compression of the press sleeve PH by means of a press tool. The plastic ring KR secures, for example, the press sleeve PH on the supporting sleeve SH and may additionally have a compression marker which is detached by the press tool during the compression process. Reliable and tight compression of a pipe line with the pipe connector RVS can thus be rendered visible from the outside. At this point it should be noted that the connections AS1 to AS3 of the pipe connector RVS can assume other configurations. In particular, the third connection AS3 may also have an internal thread or be designed analogously to the first connection AS1 and second connection AS2 for connection of pipe lines by means of a press tool. Moreover, the connections AS1 to AS3 can also be suitable for quick connect procedures, for example, for what is known as the Quick & Easy Connection System of the firm Uponor.

As can be seen from FIGS. 1 and 2, a first longitudinal axis LA1 of the first connection AS1, a second longitudinal axis LA2 of the second connection AS2 and a third longitudinal axis LA3 of the third connection AS3 lie substantially in a first plane E1. The first connection AS1 and the second connection AS2 lie on a common side in relation to a second plane E2 that lies perpendicular to the first plane E1 and runs through the third longitudinal axis LA3. In FIG. 2 the plane E1 corresponds to the image plane, the planes E1 and E2 not being shown in FIG. 2 for reasons of clarity. In addition, the longitudinal axes LA1 and LA2 are aligned parallel to one another. Furthermore, longitudinal axes LA1 and LA2 are each aligned perpendicular to the third longitudinal axis LA3. The pipe connector RVS can thus be screwed into a consumer via the external thread AG of the third connection AS3. Two pipe lines, for example, can be connected parallel and in a space-saving manner to the first connection AS1 and the second connection AS2 in the same first plane E1.

The pipe connector RVS has an inner channel IK which has a substantially constant circular cross-section. This ensures favourable flow properties, for example, a flow path of the pipe connector RVS, for example, via the first connection AS1 to the second connection AS2. Pressure losses in the pipe connector RVS are also minimised.

The first connection AS1 and the second connection AS2 are arranged spaced from one another by a distance A1. It is thus possible, for example, for an installation engineer to have easy access to both the first connection AS1 and the second connection AS2 for a press tool. The distance A1 can be designed so that this is as small as possible, without hindering access for a press tool. The distance A1 in the exemplary embodiment relates to the first longitudinal axis LA1 and the second longitudinal axis LA2.

The third connection AS3 is spaced from the first connection AS1 by a distance A2. The distance A2 relates in the exemplary embodiment to an outer face AF of the third connection AS3 and the longitudinal axis LA1 of the first connection AS1. The distance A2 is large enough for the first connection AS1 to be accessible for a press tool when the third connection AS3 is connected to a consumer.

The length of the distance A1 is preferably at least 30 mm, in particular 45 mm. The length of the distance A2 is preferably at least 50 mm, in particular 61 mm. The distances A1 and A2 are described in detail with the help of FIGS. 4 and 5.

The pipe connector RVS is produced in one piece, for example, from a cast brass material. Alternatively, other metal materials can be used. The connections AS1 to AS3 can be suitable for example, for connection of ¾ inch or ½ inch pipe lines. In that case the pipe connector RVS can be cast, for example, as a blank in such a way that depending on the requirements of the user the connections AS1 to AS3 are machined, for example, by turning the connections AS1 to AS3, for the pipe line dimension used in each case, without two different blanks being needed.

The pipe connector RVS according to FIGS. 1 and 2 is suitable for use in a ring-pipe or series-pipe system, in particular with concealed installations. For example, the pipe connector RVS can be connected in a ring-pipe or series-pipe system by means of the third connection AS3 to a consumer, for example, a concealed mixer fitting or armature. Pipe lines, for example, cold water pipe lines can be connected to the first connection AS1 and to the second connection AS2. If, for example, the mixer fitting connected to the third connection AS3 is opened and uses water, then the water is able to flow via the first connection AS1 and/or the second connection AS2 to the third connection AS3. If the mixer fitting remains closed, then water is able to flow via the U-shaped pipe section UA between the first connection AS1 and the second connection AS2. The pressure losses in this case are substantially only very slight. A series-pipe system is described with the help of FIG. 3.

Figure 3:
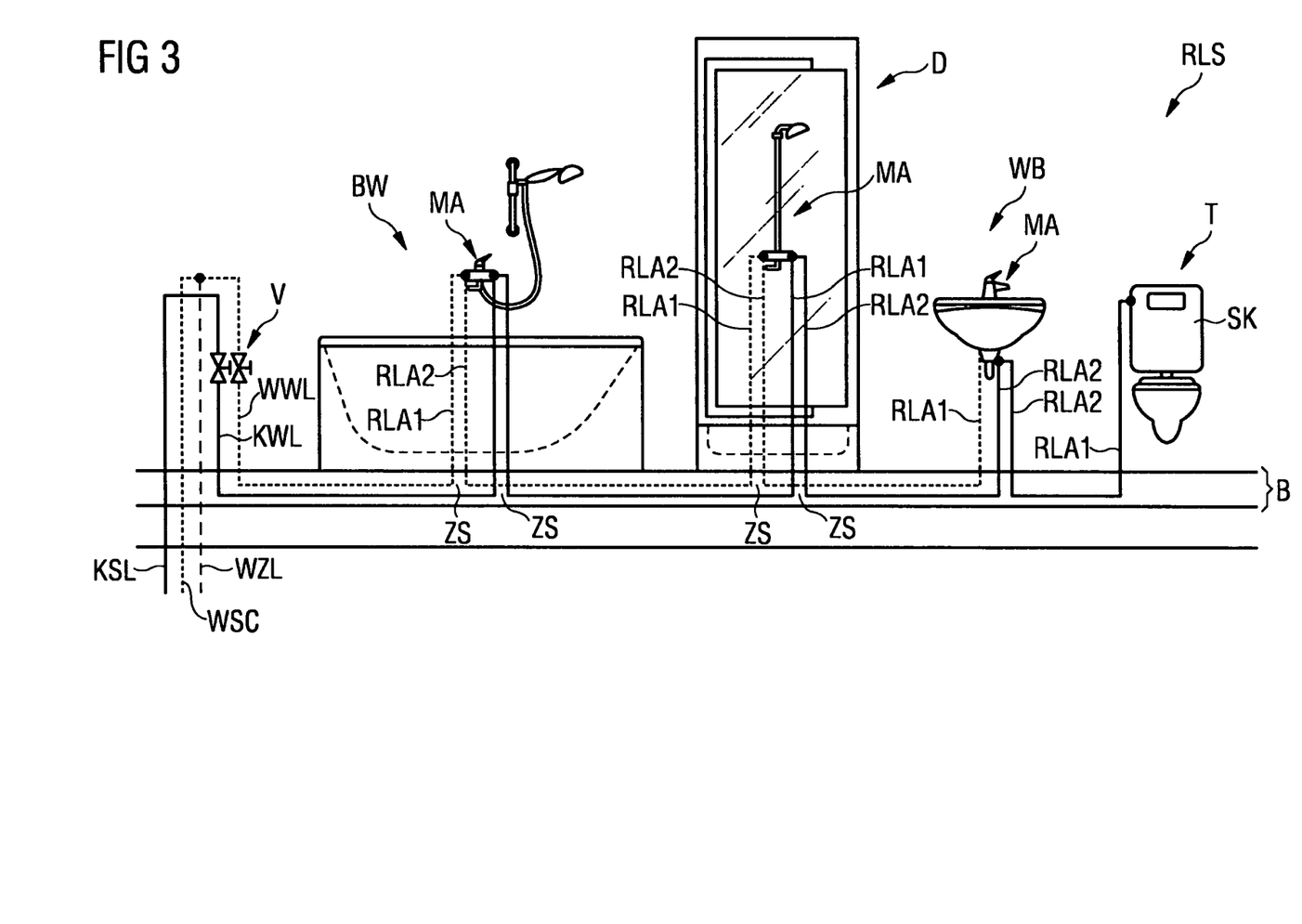
FIG. 3 shows a schematic diagram of a piping system.

FIG. 3 shows a schematic view of a series-pipe system RLS. In FIG. 3 several consumers of a storey are connected to a hot water pipe WWL and/or a cold water pipe KWL, which are laid substantially in a floor B of the storey. In FIG. 3 mixer fittings MA of a bath tub BW, a shower D and a wash basin WB are each connected both to the hot water pipe WWL and to the cold water pipe KWL. A cistern SK of a toilet T is connected only to the cold water pipe KWL.

Starting from branch points ZS, respective first pipe line sections RLA1 of the cold water pipe KWL and hot water pipe WWL lead to a consumer and respective second pipe line sections RLA2 of the cold water pipe KWL and hot water pipe WWL lead away from a consumer. In this case a first pipe line section RLA1 and a second pipe line section RLA2 are connected to the first connection AS1 and the second connection AS2 respectively of a pipe connector RVS (not shown).

The hot water piper WWL and the cold water pipe KWL are connected via valves V to a cold water riser KSL and to a hot water riser WSL respectively. The cold water riser KSL and the hot water riser WSL are main pipes of a building and normally lead from a house connection vertically into different storeys. To prevent the hot water riser WSL from cooling down when hot water is not being used, a further riser, a hot water circulation pipe WZL, is used, which allows hot water to be circulated through the hot water riser WSL and the hot water circulation pipe WZL, for example, by a pump.

In the case of the series-pipe system RLS, the hot water pipe WWL is led to the mixer fitting MA of the first consumer, the bath tub BW. The hot water pipe WWL is here connected directly via a pipe connector RVS to the mixer fitting MA and from this is led via the second connection AS2 to the next consumer, the shower D. There the hot water pipe WWL is directly connected likewise by means of a pipe connector RVS to a mixer fitting MA and leads from this directly onwards to the third consumer, the wash basin WB. As shown in FIG. 3, the hot water pipe WWL ends there. The situation with the cold water pipe KWL is analogous to the hot water pipe WWL, the only difference being that the cold water pipe KWL is led onwards from a pipe connector RVS connected to the mixer fitting MA of the wash basin WB directly to the fourth consumer, the toilet T, and is there directly connected to the cistern SK. Since all consumers are connected in series, the cold water pipe KWL and the hot water pipe WWL are known as series-pipes.

In order to avoid stagnant water in the water pipes WWL and KWL, in series-pipe systems a frequent consumer, such as the wash basin WB or the toilet T for example, is located at the end of the particular pipe lines. If hot water is now used at the wash basin WB, the hot water flows via the valve V through the entire hot water pipe WWL as far as the mixer fitting MA of the wash basin. Water flows through the entire hot water pipe WWL. There is thus no area of the hot water pipe WWL where the water is not exchanged or circulated. Therefore no areas of stagnation are able to form in which unhygienic conditions could occur, for example, as a result of the formation of bacteria. The situation is similar with the cold water pipe KWL. The toilet T, which is normally a frequently used consumer, is connected to the end of the cold water pipe KWL. Each time the toilet T is used, cold water therefore flows through the entire cold water pipe KWL. Even in the bath tub BW is used for example, only very infrequently, for example, every two weeks, no areas of stagnation form, since water flows through the entire hot water pipe WWL and cold water pipe KWL of the bath tub BW, i.e. even through the first pipe line sections RLA1 and the second pipe line sections RLA2.

If tees were to be used at the branch points ZS of the series-pipe system, RLS, from which only a first pipe line section RLA1 leads to each of the mixer fittings MA, and no second pipe line section RLA2 leads back to the branch point ZS, then areas of stagnation could form in the first pipe line section RLA1. If, for example, the shower is used and consumes water, then no water would flow in the first pipe line section RLA1 to the mixer fitting MA of the bath tub BW. Stagnant water, which could cause unhygienic conditions, would then develop in this first pipe line section RLA1.

FIG. 3 describes a series-pipe system RLS. As mentioned initially, series-pipe systems can be extended to ring-pipe systems if a pipe line is led from the last consumer back to the start of each particular series-pipe. In the exemplary embodiment of FIG. 3, the hot water pipe WWL would additionally have to be lead from the wash basin WB back to the start of the hot water pipe WWL, for example, directly after the valve V. The cold water pipe KWL would similarly have to be led back from the cistern SK of the toilet T.

By means of the pipe connector according to the embodiment in FIGS. 1 and 2 it is possible to install series-pipe or ring-pipe systems for concealed installations. For this purpose the mixer fittings MA can be concealed fittings. There follows an explanation, illustrated with the help of FIGS. 4 to 7, of how pipe lines can be connected by means of the pipe connector RVS to different consumers provided for concealed installations.

Figure 4:
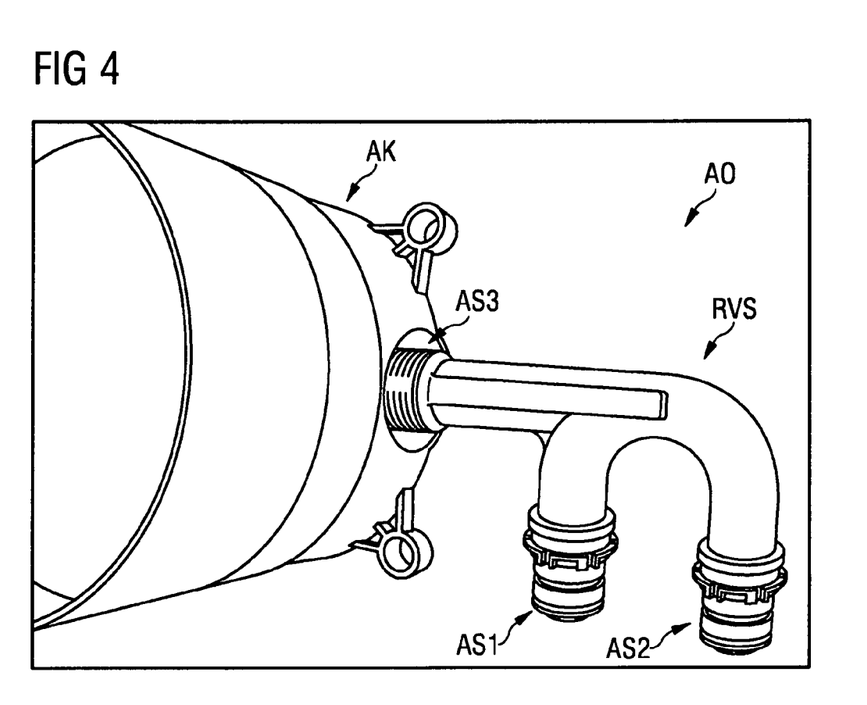
FIG. 4 shows an arrangement with a connection element of a concealed fitting and the pipe connector.

FIG. 4 shows an arrangement AO with the pipe connector RVS, which is connected by means of the third connection AS3 to a connection element AK of a concealed fitting. As described, the third connection AS3 has an external thread AG (see FIG. 1, FIG. 2), with which the pipe connector RVS can be screwed into a complementary internal thread of a connection of the connection element AK.

As already described with the help of FIGS. 1 and 2, the first connection AS1 is spaced from the second connection AS2 by a distance A1. In addition, the third connection AS3 is spaced from the first connection by a second distance A2.

Figure 5:
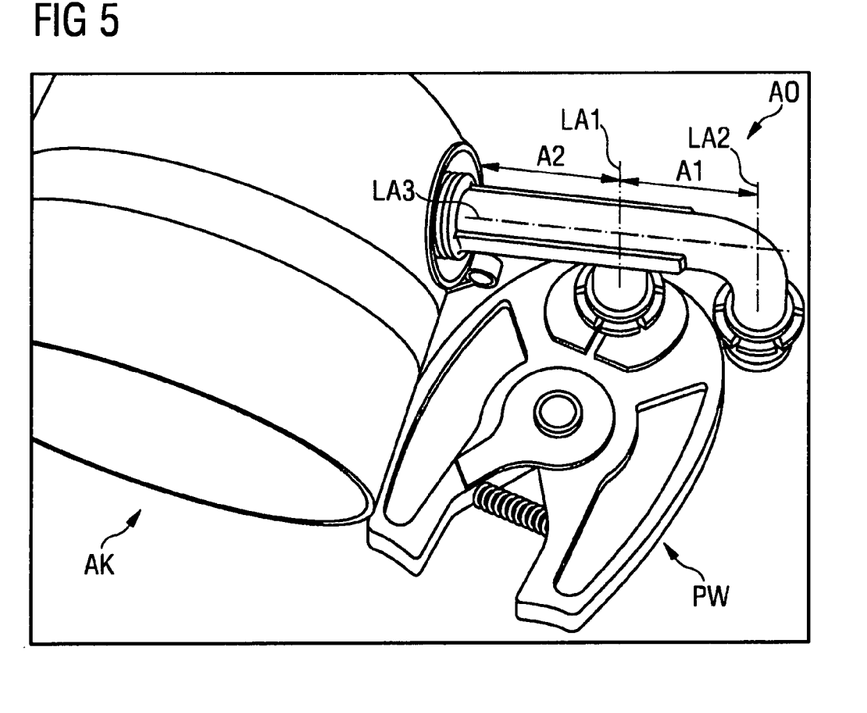
FIG. 5 shows a second arrangement with the connection element of the concealed fitting, the pipe connector and a press tool.

As a result it is possible, as can be seen from FIG. 5, to connect pipe lines to the first connection AS1 and the second connection AS2 by means of a press tool PW. There is sufficient space here to apply the press tool PW. It is therefore possible in a simple manner to connect the pipe connector RVS to a connection element AK of a concealed fitting.

If a double wallplate were to be used instead of the pipe connector RVS, the connections would not lie in one plane. For example, the third connection AS3 would be aligned in a direction normal to a plane running through the first connection AS1 and the second connection AS2. According to FIG. 4, in this normal direction, which runs substantially perpendicular to the image plane, connection of the pipe lines would need a lot of space, which is not normally available in the case of concealed installations.

Figure 6:
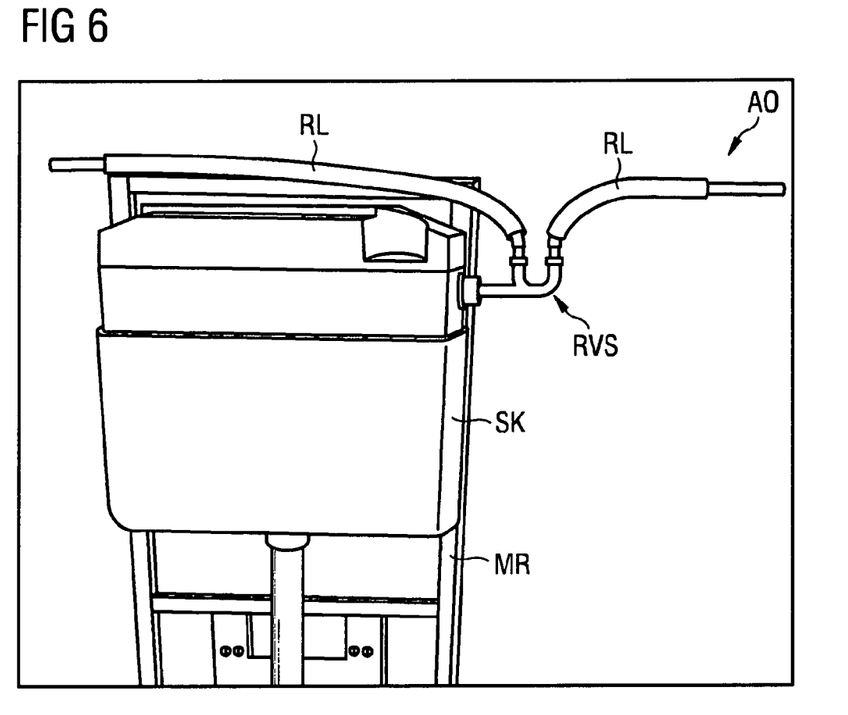
FIG. 6 shows a third arrangement with a WC cistern, the pipe connector and a pipe lines connected thereto.

FIG. 6 shows an arrangement AO with a cistern SK of a toilet and the pipe connector RVS. The pipe connector RVS is here screwed laterally into a connection of the cistern SK. The cistern SK is fastened, for example, to a mounting frame MR in a wall, in the case of a concealed installation. Pipe lines RL are connected to the pipe connector RVS at the first connection and at the second connection AS2. This exemplary embodiment also requires only a slight overall depth for the pipe line installation. In particular, a depth of the cistern SK is not exceeded here, as a result of which the pipe connector RVS is especially suitable for such an installation arrangement.

Figure 7:
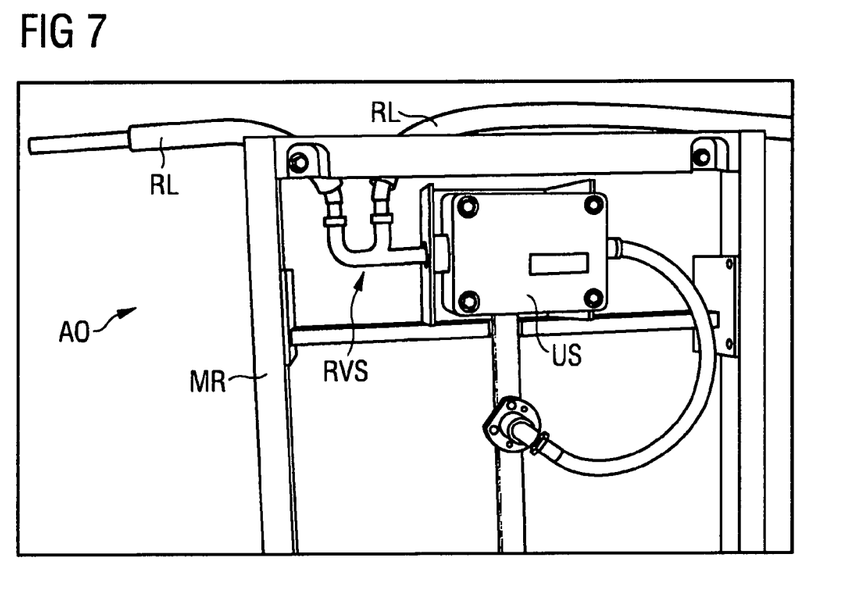
FIG. 7 shows a fourth arrangement with a urinal flushing unit, the pipe connector and pipe lines connected thereto.

A similar example is illustrated in FIG. 7. In this case a urinal flushing unit US of a concealed installation is shown, to which the pipe connector RVS is screwed. Analogously to the example according to FIG. 6 just described, the connections of the pipe connector RVS are here arranged parallel to a wall surface and therefore require only a slight overall depth. Pipe lines RL can therefore be laid substantially in one plane in a space-saving manner.

As depicted in the figures and already mentioned above, the first connection AS1 and the second connection AS2 are arrangend on a common side in relation to the second plane E2. This has the advantageous effect that pipe lines like the hot water pipe WWL can be easily connected to the pipe connector RVS from one side. As depicted in FIG. 3, pipes lines thus can be space savingly installed floor-based or next to the floor in the floor or in a wall. The pipe lines only need to be laid at one point, e.g. a branch point ZS, perpendicularly to the the pipe connector RVS. This reduces the risk of a person damaging the pipe lines by drilling holes into the wall, e.g. for hanging a picture or for fixing a cupboard. To sum up, the pipe connector RVS allows an easy, space saving installation. Furthermore, a comfortable and fast connection of pipe lines to an pipe connecter RVS is possible. In contrast to conventional installations, no additional fittings like T-fittings are necessary to connect hot water pipes or cold water pipes to consumers like armatures. This reduces the use of such additional fitting, wherein overall costs can be reduced, among others. The pipe connectors RVS can also be used, for example, in pre-wall or wall-mounted installations, for example, in a bathroom. Since all connections lie in just one plane, a small overall depth of the pre-wall and wall-mounted installation can thus be achieved. As a result, less floor area of a room, for example, a bathroom, is taken up.

LIST OF REFERENCE SIGNS

A-A Sectional plane
A1 Distance
A2 Distance
AF Outer face
AG External thread
AK Connection element
AS1 First connection
AS2 Second connection
AS3 Third connection
B Floor
BW Bath tub
E1 First plane
E2 Second plane
D Shower
IK Inner channel
KR Plastic ring
KSL Cold water riser
KWL Cold water pipe
LA Elongated pipe section
LA1 First longitudinal axis
LA2 Second longitudinal axis
LA3 Third longitudinal axis
MA Mixer fitting
MR Mounting frame
PH Press sleeve
PW Press tool
RL Pipe line
RLA1 First pipe line section
RLA2 Second pipe line section
RLS Series-pipe system
RVS Pipe connector
SH Supporting sleeve
SK Cistern
T Toilet
UA U-shaped pipe section
US Urinal flushing unit
V Valve
VR Reinforcing rib
WB Wash basin
WSL Hot water riser
WWL Hot water pipe
WZL Hot water circulation pipe
ZS Branch point

The invention claimed is:

1. A series-pipe system or ring-pipe system of a water installation in a building, comprising a cold water pipe line and a warm water pipe line;
at least one water consumer, and
a first pipe fitting and a second pipe fitting each of the first pipe fitting and the second pipe fitting including a pipe connection for an in-wall installation of the series-pipe system or ring-pipe system, each of the first pipe fitting and the second pipe fitting including:
  a first connection including a profiled supporting sleeve including a plurality of supporting ribs and a press sleeve, the profiled supporting sleeve and the press sleeve being configured to sealingly receive an end of a pipe therebetween, a second connection and a third connection,
  wherein longitudinal axes of the connections are located substantially in a first plane,
  wherein the first connection and the second connection are arranged on a common side in relation to a second plane, the second plane being aligned perpendicular to the first plane and running through the longitudinal axis of the third connection,
  wherein the third connection comprises a thread,
  wherein the first connection and the second connection are linked by a U-shaped pipe section,
  wherein the U-shaped pipe section forms an elongated pipe section that comprises the third connection,
  wherein the elongated pipe section and the U-shaped pipe section are produced from one metal piece, and
wherein the first connection and the second connection are spaced from one another in such a manner that the first connection and the second connection are accessible for connection of pipe lines by a pressing tool;
wherein a first pipe line section of the cold water pipe line is connected to the first connection of the of first pipe fitting and a second pipe line section of the cold water pipe line is connected to the second connection of the of first pipe fitting;
wherein the first pipe fitting is connected to a cold water connection of the at least one water consumer via the third connection of the first pipe fitting;
wherein a first pipe line section of the hot water pipe line is connected to the first connection of the of second pipe fitting and a second pipe line section of the hot water pipe line is connected to the second connection of the of second pipe fitting; and
wherein the second pipe fitting is connected to a hot water connection of the at least one water consumer via the third connection of the second pipe fitting;
such that, if the at least one water consumer is opened and uses hot and/or cold water from the hot and/or cold water pipe line, then the water is able to flow via the first connection and/or the second connection to the third connection of the respective first and/or second pipe fitting, and, if the at least one water consumer remains closed, then water is able to flow via the U-shaped pipe section between the first connection and the second connection of the respective first and/or second pipe fitting, in order that stagnation areas and hence lack of hygiene are avoided.

2. The series-pipe system or ring-pipe system of claim 1, wherein the longitudinal axes of the first connection and the second connection are aligned parallel to one another.

3. The series-pipe system or ring-pipe system of claim 1, wherein the longitudinal axes of the first connection and the second connection are each aligned perpendicular to the longitudinal axis of the third connection.

4. The series-pipe system or ring-pipe system of claim 1, wherein at least one of the pipe connectors of the first pipe fitting and the second pipe fitting has an inner channel that has a substantially circular cross-section for linking the three connections.

5. The series-pipe system or ring-pipe system of claim 1 wherein the thread of the third connection is an external thread for connection of the pipe connector to a consumer.

6. The series-pipe system or ring-pipe system of claim 1, wherein the third connection has a pre-determined length, and therefore the first connection is accessible for connection of pipe lines by a press tool when a consumer is connected to the third connection.

7. The series-pipe system or ring-pipe system of claim 1, wherein the first connection is configured for connecting pipe lines by compression.

8. The series-pipe system or ring-pipe system of claim 1, wherein the first connection further comprises a plastic ring, wherein the press sleeve has an end, and wherein the plastic ring surrounds the end.

9. The series-pipe system or ring-pipe system of claim 1, wherein at least one of the pipe connectors of the first pipe fitting and the second pipe fitting is produced by casting.

10. The series-pipe system or ring-pipe system of claim 1, wherein at least one of the pipe connectors of the first pipe fitting and the second pipe fitting is produced from a cast brass material.

11. The series-pipe system or ring-pipe system of claim 1, wherein at least one of the pipe connectors of the first pipe fitting and the second pipe fitting is suitable for use in series-pipe systems.

12. The series-pipe system or ring-pipe system of claim 1, wherein at least one of the pipe connectors of the first pipe fitting and the second pipe fitting is suitable for connection to a connection element of a concealed fitting.

13. The series-pipe system or ring-pipe system of claim 1, wherein the first connection is configured for connecting pipe lines using a quick connect procedure.

14. The system of claim 1, wherein the water installation is an in-wall installation and the at least one water consumer is a concealed fitting, wherein the first and/or second pipe fitting is screwed by way of the thread of the third connection in a respective connection of a connection element of the concealed fitting.

\* \* \* \* \*